(12) United States Patent
Meng et al.

(10) Patent No.: US 8,006,125 B1
(45) Date of Patent: Aug. 23, 2011

(54) AUTOMATIC DETECTION AND RECOVERY OF CORRUPT DISK METADATA

(75) Inventors: Yi Meng, Bellevue, WA (US); Matthew M. Kerner, Seattle, WA (US); Karan Mehra, Redmond, WA (US); Parveen K. Patel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 11/117,861

(22) Filed: Apr. 29, 2005

(51) Int. Cl.
*G06F 11/00* (2006.01)

(52) U.S. Cl. .......................................................... 714/6

(58) Field of Classification Search ...................... 714/6
See application file for complete search history.

(56) References Cited

U.S. PATENT DOCUMENTS

| | | | |
|---|---|---|---|
| 5,615,330 A * | 3/1997 | Taylor ........................... | 714/6.32 |
| 6,230,285 B1 * | 5/2001 | Sadowsky et al. ............... | 714/14 |
| 6,308,265 B1 * | 10/2001 | Miller .............................. | 713/2 |
| 6,421,792 B1 * | 7/2002 | Cromer et al. .................. | 714/36 |
| 6,430,663 B1 * | 8/2002 | Ding .............................. | 711/162 |
| 6,490,722 B1 * | 12/2002 | Barton et al. .................. | 717/174 |
| 6,560,701 B1 * | 5/2003 | Berstis et al. .................... | 713/2 |
| 6,564,338 B1 * | 5/2003 | Sasaki et al. ..................... | 714/5 |
| 6,584,583 B2 * | 6/2003 | Nam ................................ | 714/42 |
| 6,792,556 B1 * | 9/2004 | Dennis .............................. | 714/6 |
| 6,862,681 B2 * | 3/2005 | Cheston et al. .................. | 713/2 |
| 6,963,951 B2 * | 11/2005 | Ng et al. ......................... | 711/112 |
| 7,111,202 B2 * | 9/2006 | Cagle et al. ..................... | 714/36 |
| 7,143,275 B2 * | 11/2006 | Cepulis et al. .................... | 713/1 |
| 7,194,659 B2 * | 3/2007 | Buchanan et al. ............... | 714/36 |
| 7,216,251 B2 * | 5/2007 | Gaunt et al. ...................... | 714/6 |
| 7,219,257 B1 * | 5/2007 | Mahmoud et al. ................ | 714/6 |
| 7,340,638 B2 * | 3/2008 | Nicholson et al. ........... | 714/6.11 |
| 7,373,551 B2 * | 5/2008 | Rothman et al. ................ | 714/30 |
| 7,734,945 B1 * | 6/2010 | Levidow et al. .................. | 714/3 |
| 2002/0059498 A1 * | 5/2002 | Ng et al. ........................ | 711/112 |
| 2002/0112198 A1 * | 8/2002 | Lim et al. .......................... | 714/7 |
| 2002/0152333 A1 * | 10/2002 | Nam ................................. | 710/1 |
| 2004/0044886 A1 * | 3/2004 | Ng et al. ........................... | 713/1 |
| 2004/0153724 A1 * | 8/2004 | Nicholson et al. ................ | 714/6 |
| 2006/0041738 A1 * | 2/2006 | Lai .................................... | 713/2 |
| 2008/0155331 A1 * | 6/2008 | Rothman et al. ............... | 714/36 |
| 2009/0327813 A1 * | 12/2009 | Coronado et al. .............. | 714/36 |

OTHER PUBLICATIONS

Press Release—"Winternals Recovery Manager 2.0 Provides Rapid, Reliable System and Date Recovery" [online] (Apr. 4, 2005) (printed Oct. 2005) (3 pages).
"Winternals Recovery Manager Quick Start Guide" [online] (Mar. 2005) (8 pages).
Winternals "Recovery Manager 2.0 User's Guide" [online] (printed Oct. 2005) (148 pages).
Winternals "Recovery Manager: Product Overview" [online] (printed Oct. 2005) (3 pages).
"Phoenix FirstWare Recover Pro Version 2.0" [online] (Aug. 7, 2003) (42 pages).
"Phoenix FirstWare Recover Version 2.3" [online] (Aug. 8, 2003) (14 pages).
"Remote Recover" [online] (Apr. 8, 2002) (printed Oct. 2005) (2 pages).
"NTRecover" [online] (Jul. 9, 1997) (printed Oct. 2005) (2 pages).
"Bugslayer" [online] (Jun. 2002) (printed Oct. 2005) (9 pages).

* cited by examiner

*Primary Examiner* — Amine Riad

(57) ABSTRACT

Provided is a technique to automatically detect and recover a computer system after a failed attempt to read a partition, for example, a failed attempt to boot a target operating system, caused by corrupt disk metadata, such as a corrupt partition table metadata or a corrupt boot sector metadata.

7 Claims, 13 Drawing Sheets

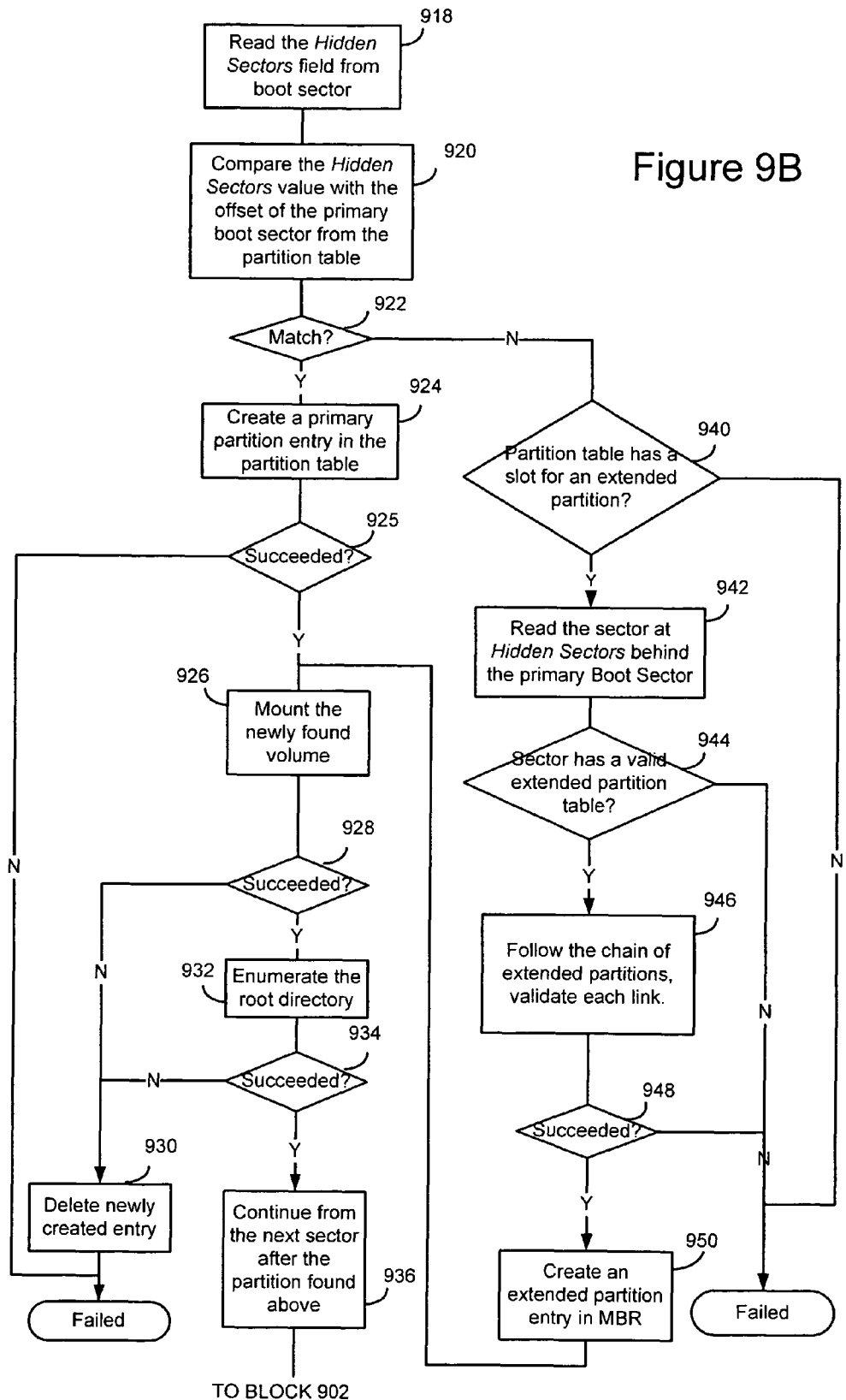

AUTOMATIC DETECTION AND RECOVERY OF CORRUPT DISK METADATA

FIELD OF THE DISCLOSURE

The present disclosure relates generally to disk partitions for a computer system and, more particularly, to recovering an unreadable disk partition.

BACKGROUND

Boot start up problems limit system performance and can lead to undesirable down time and in extreme situations, the user deeming the machine as unrecoverable. This can ostensibly create a situation where data is lost, not by necessity, but by lack of experience or frustration. The source of boot problems abound and can come from registries getting corrupted, system files corruption, service problems, and missing drivers, to name a few. At times boot problems can arise from boot processes that occur before a computer can fully recognize a bootable system volume, or hard disk.

In conventional systems, a user is left to determine what is causing the problem in order for the user to be able to fix the problem. There are no effective ways to diagnose problems that have caused the boot failure. Instead, conventional systems at most provide manual recovery that seeks to restore some previous stored default or "safe" boot environment. The most common examples are recovery boot disks or a user's ability to boot from the original CD-ROM of the operating system. The process is manually operated, because the computer system polls the user to initiate recovery.

Some systems attempt to expedite boot start-up upon a boot failure by storing multiple basic input/output system (BIOS) initial memory locations in hardware or firmware. The BIOS, the main operating system BIOS, may start up via executing a boot loader sequence starting at a fixed, stored memory location of a boot block. If that main boot loader sequence does not initiate, then the firmware/hardware may instruct the system to go to a second memory location of the boot block to execute a "safe" boot loader sequence, for example, a separately stored, factory default boot loader sequence. Of course, in practice such systems are incomplete.

These systems do not actually diagnose the reasons for boot failure; instead they are based on restoring the system state to a previously bootable one, irrespective of the cause of the failure. These systems require a recovery disk, which in some circumstances may not be available, either because the disk is not available or because the failure to even initialize drivers in the computer system means that the computer system does not recognize its own CD-ROM, floppy, Universal Serial Bus (USB), or other drives.

Furthermore, conventional systems do not diagnose and recover from boot failures caused by the boot data accessed at the early stages of a boot process. Partition table metadata and boot sector metadata for example are used in reading a disk partition. If either of these metadata structures is corrupt, it is not possible to access data on the disk partition(s) associated with the corrupt data structure. If the corrupt or missing data belongs to a boot-critical partition, for example, a system volume containing the main operating system, the computer system will fail to boot. If the corrupt or missing data belongs to a data partition, the computer system 110 will fail to read that system. There are no automatic diagnoses and recoveries to the problem of unreadable partitions.

SUMMARY

In some examples, a system provides an automatic recovery from an unreadable disk partition, for example an unreadable boot partition or an unreadable data partition. A diagnostic and recovery tool may execute on the computer system, to automatically diagnose corrupt disk metadata on a hard disk to determine the cause of the unreadable partition. The recovery tool may then recover the corrupt disk metadata to allow the disk partition to be read. For a boot partition, for example, the recovery tool may repair from corrupt disk metadata, such as corrupt boot metadata, corrupt partition table metadata, and corrupt boot sector metadata. This corrupt disk metadata may be corrupted with wrong or missing data, for example. The tool may recover a corrupt, first disk metadata by analyzing a valid, second disk metadata and using the latter to reconstruct the corrupt, first disk metadata or repair the corrupt disk metadata by replacing it with a validated rendition of the first disk metadata.

Some of the example systems may include a computer readable medium having computer executable instructions for performing steps of recovering an unreadable partition comprising: determining when the first disk metadata on a hard disk is corrupt; identifying a valid second disk metadata on the hard disk; analyzing the valid second disk metadata; and in response to the analysis of the valid second disk metadata, recovering the first disk metadata.

DRAWINGS

FIGS. 9A and 9B illustrate another example disk metadata recovery operation that may be used to recover from corrupt partition table metadata.

DESCRIPTION

Although the following text sets forth a detailed description of numerous different embodiments, it should be understood that the legal scope of the description is defined by the words of the claims set forth at the end of this patent. The detailed description is to be construed as illustrative only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
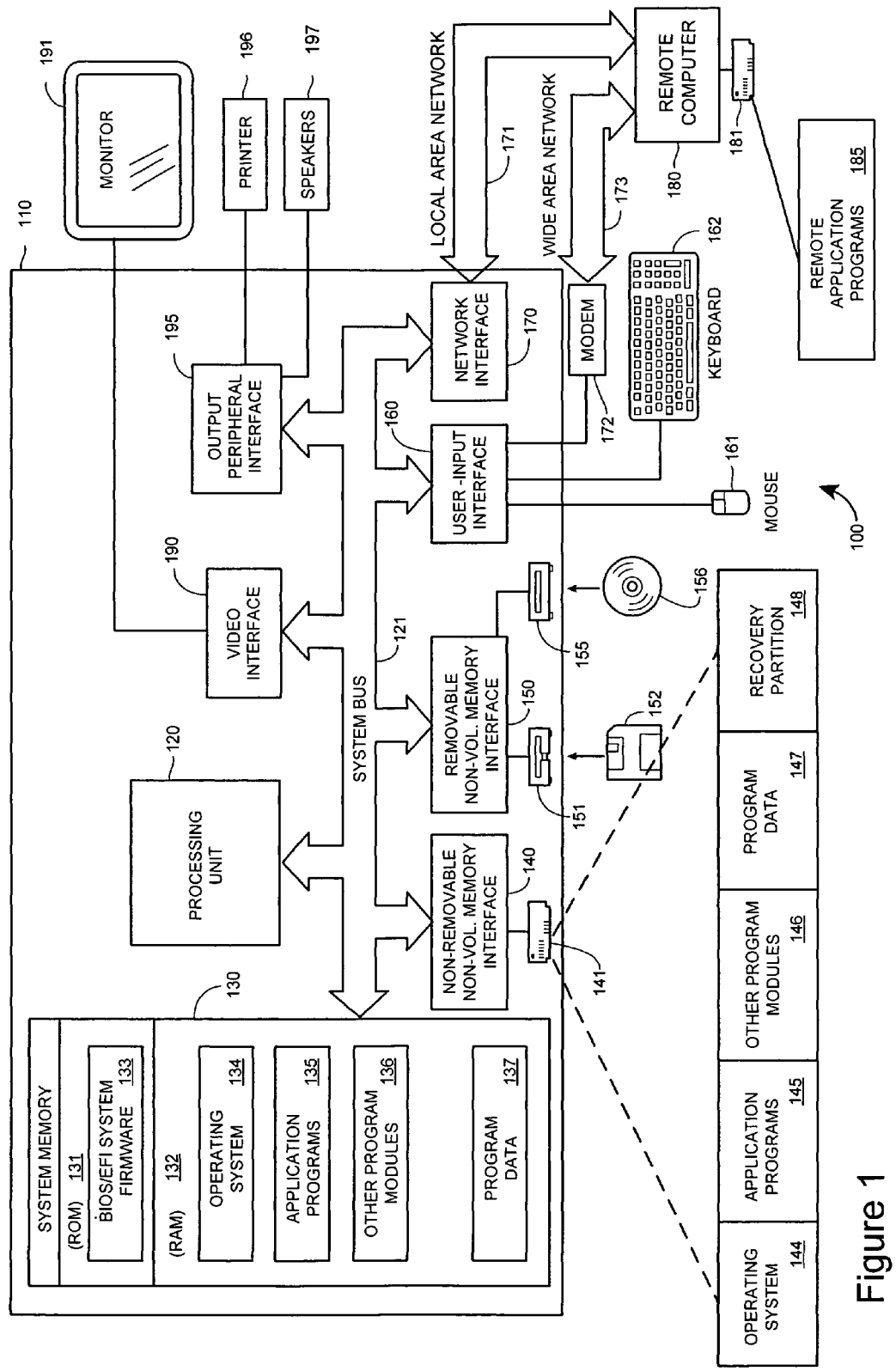
FIG. 1 is a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatuses of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means, a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. Depending on the type of computer system 110, a basic input/output system (BIOS) or Extensible Firmware Interface (EFI) system firmware 133 containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards; digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they may be different copies. In some examples, the hard disk 141 may also include a recovery partition 148 that stores a recovery environment, as discussed below. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

During normal boot operation, a user activates the computer system 110 initiating a boot sequence to execute the target operating system 144. An entire boot sequence may contain a number of different boot processes, some that are independent of the target operating system 144 (which may be the source copy of the operating system 134 prior to a computer boot) and some that are dependent upon the target operating system 144. The former category may include the early boot processes data associated with the computer system 110, such as hard disk metadata. This disk metadata may be used not only to identify a boot partition on the hard disk 141, but also to identify a data partition. For bootable partitions, the disk metadata may identify the partition as an active partition, which includes the system partition and system volume. The disk metadata in such circumstances may include partition table metadata, boot metadata and file system metadata, for example. For data partitions, i.e., non-bootable partitions, the disk metadata may include all this metadata or a portion thereof, such as the partition table metadata and file system metadata. In an MBR disk, for example, the MBR would include boot metadata in the form of a boot code and partition table metadata in the form of the partition table (e.g., identifying the location of various partitions on a hard disk 141 as well as a partition type descriptor and whether the partition is the active partition). The MBR disk would also include boot sector metadata corresponding to the boot sector and including the file system metadata (e.g., describing where the MFT or FAT is and where directories, files and partitions reside) and boot metadata (e.g., metadata identifying the partition as an active partition). In EFI systems, disk metadata may include a globally unique identifier (GUID) Partition Table (GPT), system files on the EFI system partition (ESP).

Under normal boot conditions, the computer system 110 loads the target operating system 144 from an active partition on the hard disk 141, which may have a file system such as File Allocation Table (FAT) file system (like FAT16, FAT32, or VFAT) or a New Technology File System (NTFS). The file system may be one that has a backup file system metadata. The partition types for such file systems may be MBR or GPT. Example computer systems using EFI boot processes include those based on the IA64 microprocessor architecture, such as the Itanium processors available from Intel Corporation, Santa Clara, Calif. This is by way of example, not limitation. 32 Bit microprocessor architectures may support EFI boot processes as well. These file systems and partition types are provided by way of example, not limitation.

Figure 2A:
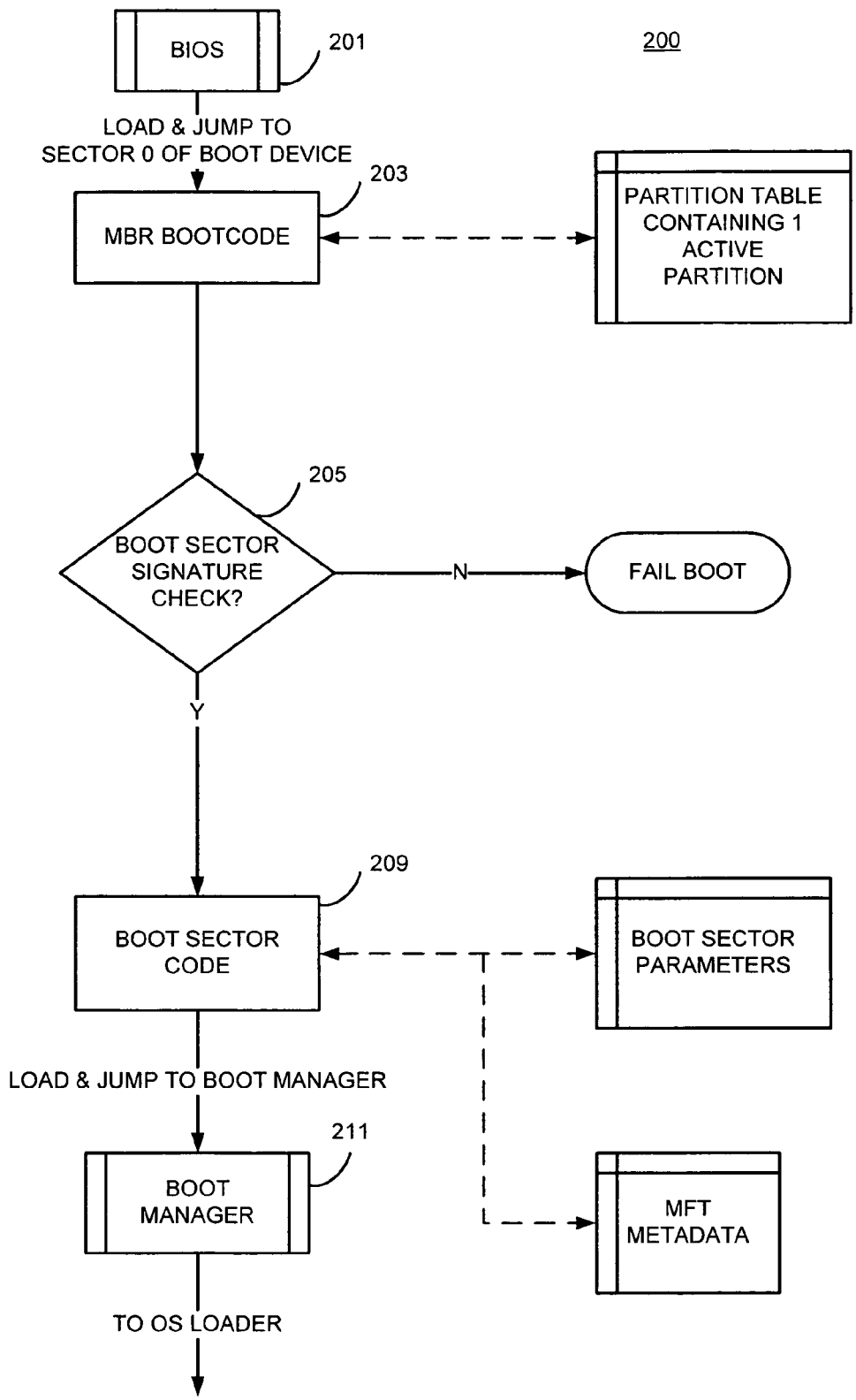
FIG. 2A illustrates an example boot process for a first type of partition disk on the computing system.

FIG. 2A illustrates an example boot process 200 for an MBR system. The computer system 110 is initiated and then BIOS starts at a block 201 and jumps to a first sector of the boot device, e.g., the hard disk 141. The BIOS block 201 loads the MBR boot code, which may be done by accessing a partition table that contains an active partition, indicating the partition from which booting should occur. Boot code is executed at block 203, which may load a first sector in the active partition, for example. A block 205 looks for a boot sector signature and checks that signature. If the check is not satisfactory, the process 200 ends. Alternatively, a backup boot sector signature check could be performed to recover a backup boot sector, if no boot sector signature is found at block 205. Once the boot sector signature checks, a block 209 accesses and executes the boot sector code, which may access boot sector parameters, and master file table (MFT) FAT or NTFS metadata. The MFT may contain metadata on the active partition, or system partition, data such as name, version, creation date and time. Under normal boot operation, control is then passed to the boot manager block 211, which selects an operating system to boot (or prompts the user to choose one) and boots an operating system loader of the selected operating system.

The MBR boot code, the partition table and the boot sector are each an example disk metadata that must be accurate to effect a successful boot of the MBR system. If any of this information is corrupt, the computer system 110 may fail to boot the target operating system 144.

Figure 2B:
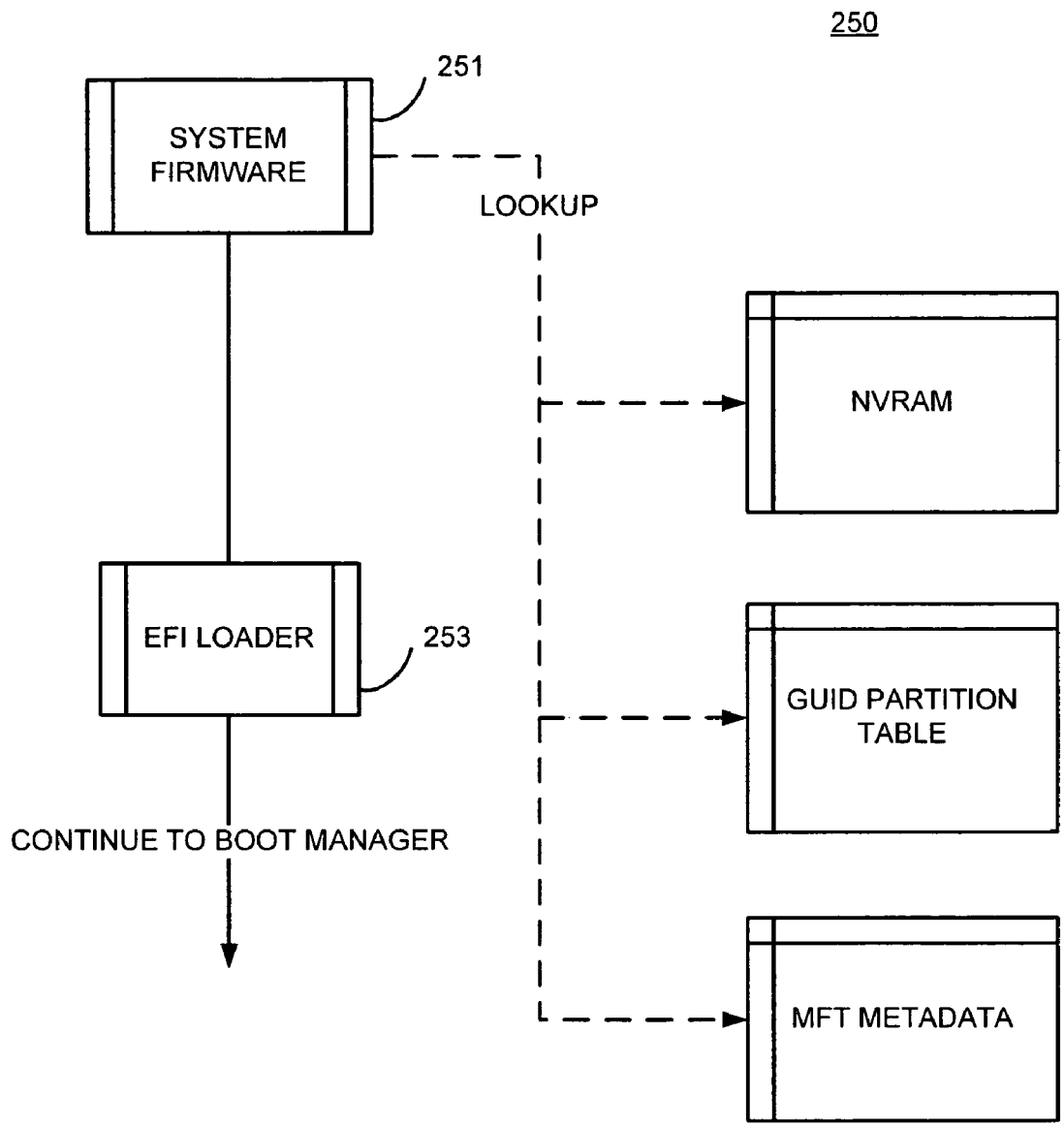
FIG. 2B illustrates an example boot process for a second type of partition disk on the computing system.

FIG. 2B illustrates an example boot process 250 for an EFI system. The computer system 110 is initiated and the EFI system firmware starts running at a block 251. The EFI system firmware may access NVRAM containing boot entries with associated variables, a GUID partition table (GPT) which defines the partitions on the disk, and MFT/FAT metadata. In the illustrated example, a block 253 then loads the EFI drivers, before passing control to an EFI boot manager, and eventual operating system loader. Unlike the MBR system, there is no boot code. Booting occurs from an ESP identified by the system firmware. By way of example, not limitation, the ESP may use a file system such as those listed above, like FAT32. The system firmware 251 access disk metadata in the form of the GPT data and the MFT FAT or NTFS metadata for booting the computer system 110. If the disk metadata is corrupt, e.g., the GPT, the boot entries in NVRAM, or system files on the ESP, the computer system 110 may fail to boot the target operating system 144.

Figure 3:
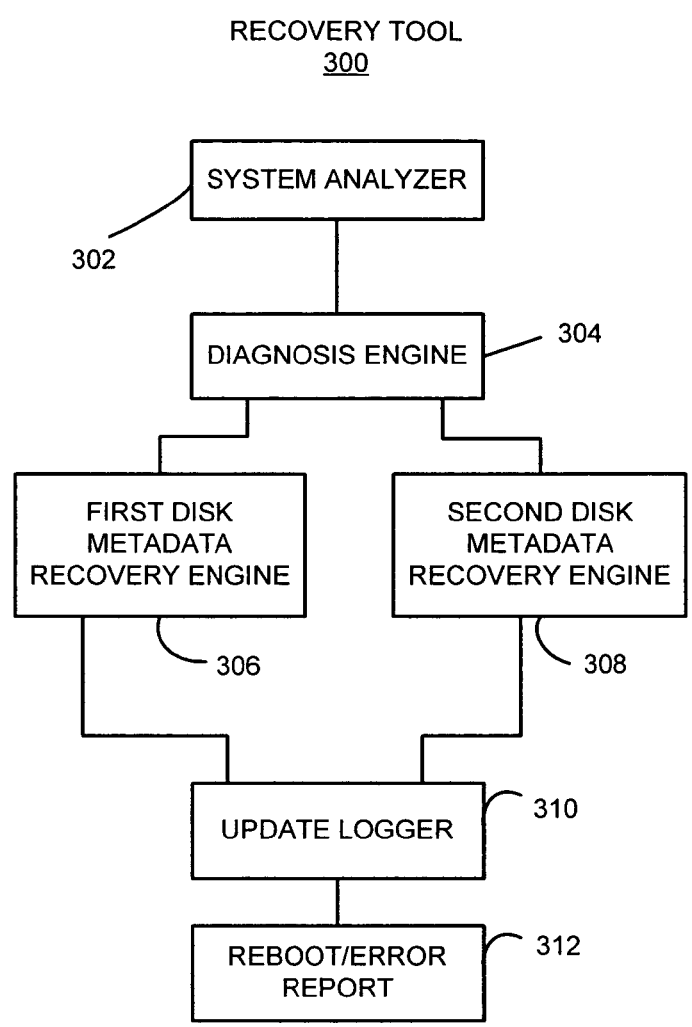
FIG. 3 illustrates an example of a recovery tool that may be implemented by the computing system of FIG. 1 to detect and recover from corrupt disk metadata.

FIG. 3 illustrates a recovery tool 300 that may be used to diagnose and recover from unreadable partitions, whether the partition is an active partition or a data partition. The tool 300 may be used to recover from a failure to boot the target operating system 144 or from a failure to read any partition such as a data partition. The recovery tool 300 may be used to recover disk metadata, including partition table metadata, boot metadata, and boot sector metadata, including file system metadata. The recovery tool 300, for example, may be invoked by the computer system 110 upon a failed attempt to boot the target operating system 144, where a failed boot attempt may comprise one boot failure or a number of consecutive boot failures. And the recovery tool 300 may be invoked when any partition is unreadable, including a data partition. The recovery tool 300 may be stored on an insertable storage media and invoked by the computer system 110 instructing a user upon boot failure to insert that storage media. Alternatively, the recovery tool 300 may be invoked automatically from the hard disk 141, for example, from the recovery partition 148 or other partition, or from other storage media automatically accessed by the computer system 110.

The recovery tool 300 analyzes disk metadata to determine which of the disk metadata is the root cause of the failure to read the partition, e.g., which metadata is corrupt (which for convenience purposes also includes missing), and to recover that metadata accordingly. The recovery tool 300, for example, may automatically detect a corrupt metadata associated with the active partition or data partition and repair the corrupt metadata, e.g., by scanning the hard disk 141 for valid renditions of the metadata, such as backup rendition of the metadata, or reconstruct the corrupt metadata from renditions of other metadata. Renditions may be the same metadata or they may be different metadata from which the corrupt metadata can be reconstructed. The recovery tool 300, for example, may recover from a corrupt partition table metadata by finding, and using information contained in disk metadata, e.g., the boot sector metadata including file system metadata. The tool 300 may find a valid rendition of the corrupt partition table metadata by using the boot sector metadata. The recovery tool 300 may recover a corrupt boot sector metadata by finding and validating a rendition of the boot sector metadata, e.g., a backup copy, via the information contained in a valid partition table metadata. Furthermore, the recovery tool 300 may also identify an active partition where none has been identified otherwise, e.g., by detecting the presence of system files, such as the boot manager, on the partition. The recovery tool 300 may be a stand-alone tool, executable from a command line interface, for example, or the recovery tool 300 may be a part of a recovery environment, as described in an example implementation with respect to FIG. 10. Once the recovery tool 300 has recovered from a boot failure associated with the disk metadata structure, the computer system 110 may successfully reboot.

In the illustrated example of FIG. 3, the recovery tool 300 includes a system analyzer 302 that analyzes the early stages of a boot process. The analyzer 302, for example, may perform a system disk recognition operation that searches for a system disk, such as the hard disk 141, to identify the file system type of the system disk as well as the partition type. By way of example not limitation, the analyzer 302 may identify the file system as NTFS or FAT and the partition type as MBR or GPT. Further, the analyzer 304 may search for active partitions, data partitions, and any other partition on the device. In some examples, an analyzer may be used to look for non-physical, virtual partitions.

In the illustrated example, the recovery tool 300 includes a diagnosis engine 304 that diagnoses the system disk identified by the analyzer 302 and returns information on the potential root cause for the boot failure. The diagnosis engine 304 may pass diagnosis data to one of two disk metadata recovery engines 306, 308, which can recover from a corrupt disk metadata. Two recovery engines 306, 308 are shown by way of example only; additional or fewer recovery engines may be used, for example, to recover from additional corrupt disk metadata. Each engine 306 and 308 may be programmed to recover from a different corrupt disk metadata. For example, engine 306 may recover from a corrupt partition table metadata, and engine 308 may recover from a corrupt boot sector metadata. The recovery engines may be separated, in operation, by the partition type as well, where one recovery engine recovers from corrupt disk metadata associated with a first partition type and the other recovers from corruption associated with a second partition type. Furthermore, the recovery tool 300 may be implemented in different ways, with addition or fewer components, and though illustrated as separate, various components may be combined; for example, the engines 306 and 308 may perform the diagnosis operations of the engine 304.

With respect to recovering from a corrupt partition table metadata, and by way of example not limitation, the diagnosis engine 304 may find an active partition. If an active partition is found, the engine 304 may try to enumerate files in the partition, and if files cannot be enumerated produce diagnosis data that identifies the root cause for the inability to read a partition as the boot sector metadata for that partition. If no partition is found, then the engine 304 may identify the root cause as no system partition. The engine 304 may then look for file system metadata identifying a partition and depending on the results from this search return a corrupt, e.g., missing, system files root cause. The engine 304 may also perform boot sector checks to determine if the root cause is a corrupt boot sector, corrupt active partition, or an unknown partition.

For MBR disks, the recovery tool 300 may also recover from corrupt boot code. The engine 304, for example, may identify a root cause for the boot failure and then selectively pass that identified root cause to recovery engines 306 and 308 that each execute a boot code recovery process for an MBR disk. The blocks 302-308 may be programmed such that the engines 306 and 308 would recover from disk metadata associated with the partition and file system type, such that no boot code recovery would be attempted in EFI or other disks that do not have a boot code on the disk. In an example boot code recovery, the recovery tool 300 may rely upon a partition table metadata, and boot signatures, to search for a recovery boot code, which may be stored at a fixed location on a particular partition. The recovery tool 300 may validate this recovery boot code against a known version, and replace the corrupt boot code accordingly if validation is confirmed.

By way of a further example and not limitation, for a GPT system volume, the engine 304 may find the ESP, mount the ESP, and check system files on the ESP to identify a missing system files root cause. If the ESP is not found, the engine 304 may perform a check of the error data on the partition table to determine if the root cause is a corrupt GPT or a no ESP (system partition) at all. In other examples, the engine 304 may identify root causes that may not be recoverable by the recovery tool 300 but rather are to be communicated to a recovery environment for addressing; an example includes a corrupt, including missing, boot manager.

With respect to recovery from corrupt boot sector metadata, and by way of example not limitation, the recovery tool 300 may recover corrupt boot sectors for a partition by automatically accessing a valid rendition of the boot sector and replacing the corrupt boot sector with the valid rendition. The recovery tool 300, for example, may use partition table metadata to identify a partition on the hard disk 141 or other storage media and then search the partition for the valid rendition of the boot sector.

The described and illustrated configurations of the recovery tool 300 are provided by way of example not limitation. The engines 306 and 308 may be combined in whole or in part. Further still, each engine 306 and 308 may have additional features, some of which are described below. The recovery tool 300 may be programmed to allow for an undo of any changes to the computer system 110 during recovery of disk metadata, e.g., during recovery of the disk metadata. The recovery tool 300 may make a backup of every hard disk sector the tool 300 changes and allow for reinstatement during an undo mode. The recovery tool 300 may support undo of all changes it makes to the hard disk 141, such that if the recovery tool 300 fails to recover an unreadable partition, then the hard disk 141 may be automatically restored to its previous state before exiting.

In the illustrated example, and not by limitation, once recovery is complete, the recovery tool 300 may update log diagnosis and recovery information via a logger 310. For failed boot recovery, the logger 310 may also update boot configuration data for the system to let the boot manager know which partition to boot from. The recovery tool 300 may reboot the computer system or report failed recovery attempt data via a process 312.

The recovery tool 300 may be stored on the hard disk 141 in a boot volume or partition separate from the system partition storing the target operating system 144. For example, the recovery tool 300 may be stored in the recovery partition 148, which may be hidden or locked from the user to protect the recovery tool 300 from alteration or corruption. More generally, the recovery tool 300 may be stored on any portion of the hard disk 141 or other storage disk, whether within the computer system 110 via the interface 140 or coupled thereto, for example via the network interface 170. In other examples, the recovery tool 300 may be stored on the nonvolatile optical disk 156, e.g., on CD-ROM or DVD-ROM, for example, on the operating system set-up CD-ROM. In other examples, the recovery tool 300 may be stored on other removable storage media. Further still, the entire recovery tool 300 may be stored within a single volume or distributed across different volumes. These are provided by way of example, not limitation.

Figure 4:
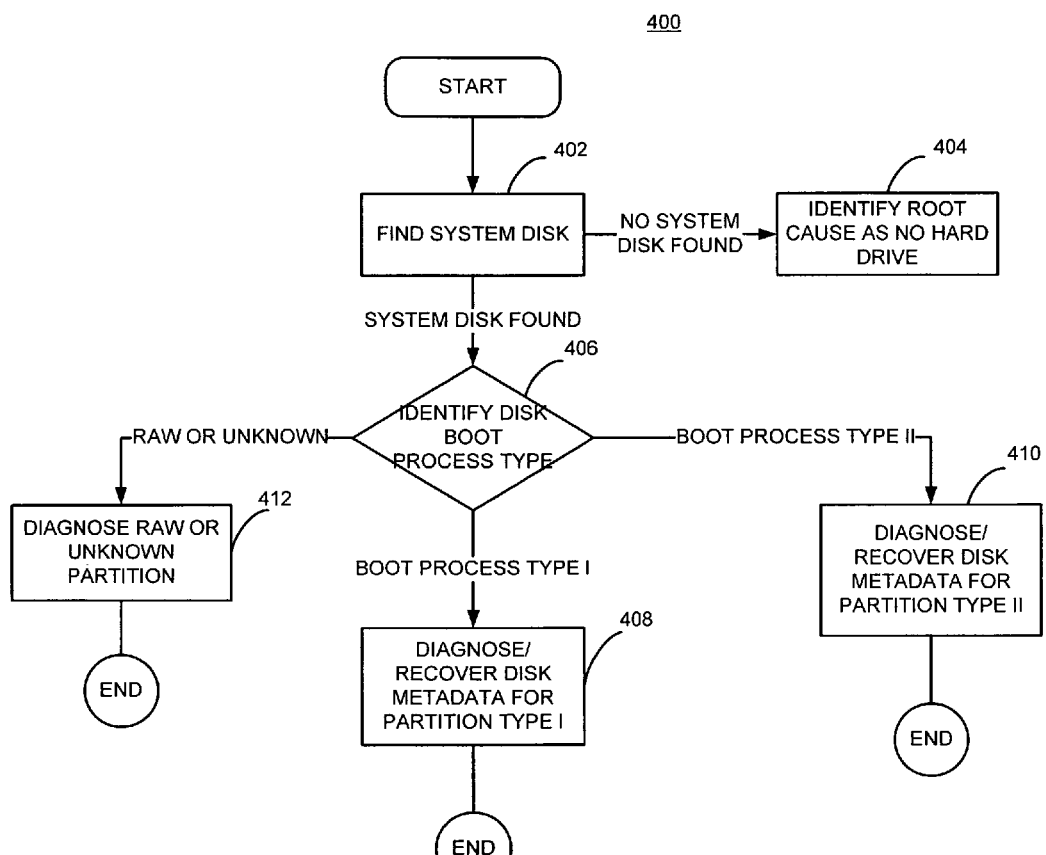
FIG. 4 illustrates an example operation that may be executed by the recovery tool of FIG. 3.

FIG. 4 illustrates an example recovery process 400 that may be executed by the recovery tool 300. The process 400 is invoked by the computer system 110 and automatically identifies a system disk at block 402, which may be executed via the early boot process analyzer 302. For MBR systems, for example, the system disk may be the first firmware enumerable hard disk on the computer system 110.

If no system disk is found at the block 402, for example, the hard disk 141 is not found, then the block 402 may identify the root cause as the lack of a hard drive, which data may be stored, provided to the user via the monitor 191, or otherwise provided to subsequent processing or the process may simply end via block 404, as shown. If a system disk is found, a block 406 may identify the type of boot process for the hard disk 141. By way of example not limitation, the block 406 may identify a first partition type on the hard disk 141, such as MBR, and a block 408 may diagnose and recover disk metadata for that partition type, such as the boot metadata, partition table metadata, boot sector metadata, and file system metadata. By way of example not limitation, the block 406 may identify a second partition type on the hard disk 141, such as GPT, and a block 410 may diagnose and recover disk metadata corresponding to the second partition type, such as partition table metadata (GPT) or EFI loader.

The block 406 may also identify when the boot disk is raw, i.e., has no partition, or has an unknown partition. In such cases, in the illustrated example, the block 406 passes control to a block 412 which determines the partition type. By way of example, not limitation, the block 412 may execute an algorithm to determine if the hard disk has one of the known partition types, e.g., MBR or GPT. The block 412 may identify a variety of root causes. For example, the block 412 may identify a raw system disk, a corrupt MBR boot code or a corrupt MBR or GPT partition table metadata. If the hard disk 141 is determined to be raw, then the recovery tool 300 may provide that data to another diagnosis and recovery system, such as the system discussed with reference to FIG. 10 below.

Figure 5:
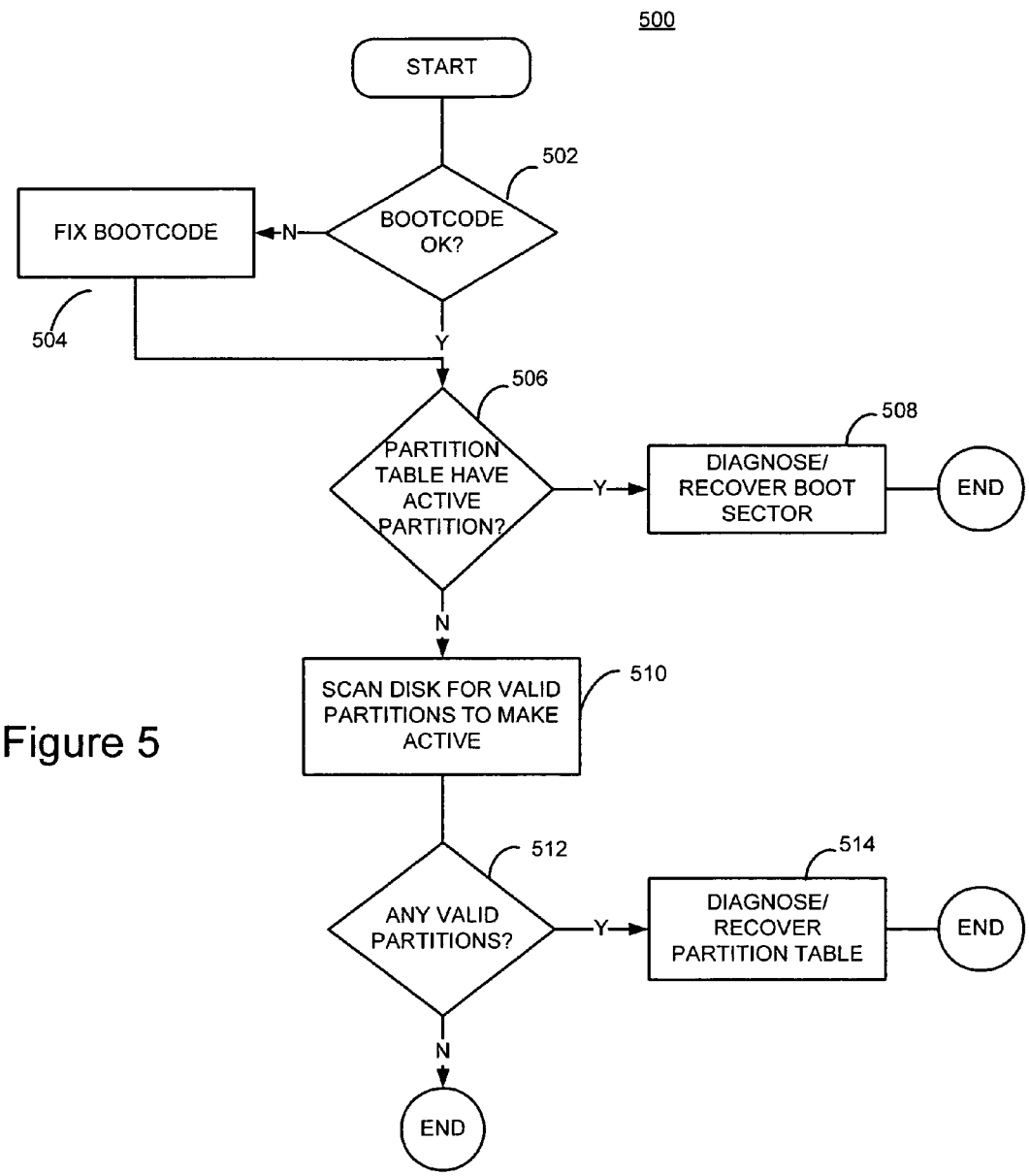
FIG. 5 illustrates an example diagnosis and recovery operation that may be executed by the example of FIG. 4 to recover corrupt disk metadata.
Figure 6:
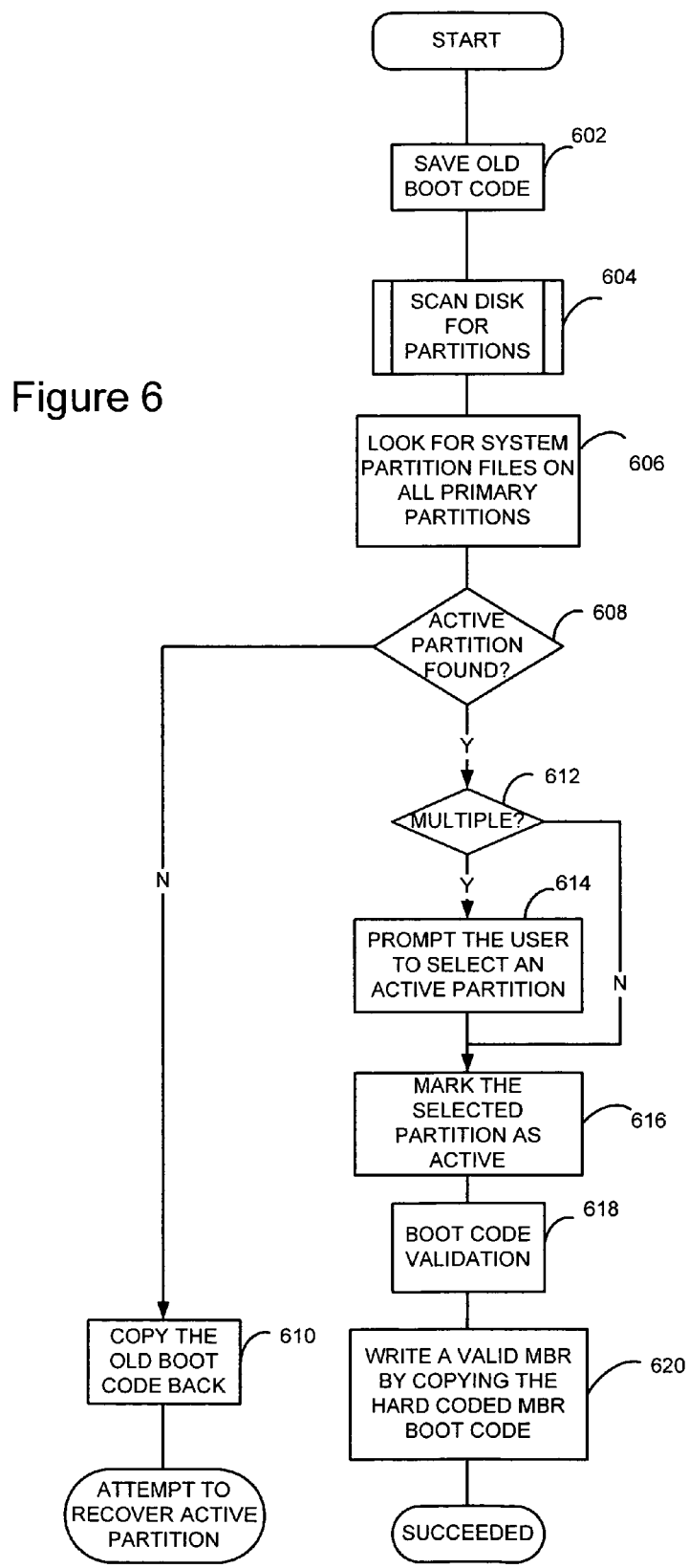
FIG. 6 illustrates an example boot code recovery as may be executed during the operating of the example of FIG. 5.

FIG. 5 illustrates an example recovery process 500 that may be executed by blocks 408-410. For an MBR system, a block 502 diagnoses the boot code portion of the boot metadata, and a block 504 fixes the boot code if there is a problem, for example by automatically finding a backup copy of the boot code, validating the backup copy, and writing the backup copy to the hard disk, e.g., the active partition identified on the hard disk 141. Various boot code recovery tools may be used. An example implementation of the boot code recovery is illustrated in FIG. 6. The boot code diagnosis and recovery of blocks 502 and 504 are optional and would not be used in EFI systems.

If the boot code was determined to be accurate at block 502 or if fixed at block 504, or if there was no boot code (as with EFI systems) a block 506 begins diagnosing disk metadata, such as the partition table metadata and boot sector metadata, to determine if either are corrupt. For example, if the block 506 finds an active partition is on the boot disk, the process 500 may be programmed to check the boot sector to determine if it is corrupt and the root cause of the unreadable partition. A block 508 may perform validity checks to make sure that the information contained in the boot sector is valid, e.g., by checking the signature and various other fields to make sure it is valid. In this way, one disk metadata structure, the partition table, is determined to be valid, while the other disk metadata structure, the boot sector, is determined to be corrupt. The block 508 may thus perform diagnosis and recovery processes.

If no active partition is available on a partition table, then a block 510 may scan the hard disk for a valid partition or valid partitions to reconstruct the partition table metadata. A block 512 determines if there are any valid partitions after execution of the block 510. The block 512 for example may determine if partition boot sector metadata is valid and then pass control to a block 514 that attempts to repair the active partition converting one of the valid partitions, thereby recovering the corrupt partition table metadata. If no valid partitions are available, e.g., if there is no partition table or if the partition table is determined to be missing, the process 500 will end in the illustrated example. Each of the blocks 510 and 514 may rely upon a valid boot sector metadata in reconstructing the partition table metadata. The processes of blocks 506-514 may occur for any partition type recoverable by the recovery tool 300 and on any file system for that partition type.

Various example disk metadata diagnosis and recovery processes are described below. The processes are provided by way of example not limitation. Furthermore, although some of the processes are described in reference to recovering a particular partition type, they are not limited to the described environments. The processes may be used to recover any unreadable partitions, whether a boot partition or a data partition.

FIG. 6 illustrates an example process 600 for diagnosing and recovering a boot code, for example, as may be performed by the block 504. The process 600 may be used to correct for when boot code is so corrupted that the computer system 110 is unable to determine whether the hard disk 141 is partitioned or not. The boot code process is provide by way of example not limitation and is optional.

A block 602 saves the old or current boot code, so that the process 600 can reverse its changes in case of a recovery failure or a user-initiated undo. A block 604 looks for partitions on the hard disk 141. In some examples, the block 604 may be programmed to scan for and reconstruct valid partitions if none are found, similar to block 510.

After finding all the partitions on the hard disk 141, a block 606 looks for system files on all or some subset of the partitions (such as the active partition) found by the block 604. During the scan operation, the process 600 may write the newly constructed partition table back to the hard disk 141 and mount the partitions. In the illustrated example, if the process 600 does not find any system files on any partitions, the block 608 may pass control to a block 610 which writes the original boot code, and the original partition table if stored, back to the hard disk 141 and the process 600 exits, having failed to identify a partition to make the active partition. In an example, the process 600 may then pass control to an active partition recovery process as may be executed by the partition table recovery engine 306.

On the other hand, if the block 608 finds an active partition, then a block 612 determines if there are multiple partitions that contain system files, which may be an indication that multiple potential sources for correct boot code. In such cases, the process 600 may prompt the user to select an active partition via block 614, where the information presented to the user may include the name and size of the partition.

After an active partition has been marked at block 616, a block 618 may build a new boot code using data in the active partition for example by copying a hard coded version of the boot code from the storage media containing the recovery tool 300, at block 620. By way of example not limitation, the hard coded version of the boot code may be stored on an insertable or networked media, a secondary hard drive on the computer system 110, or in the cases where valid partitions are found on the hard disk 141, on a separate partition. The boot code may also be stored on certain reserved, hidden, or any available sectors on the disk.

The block 618 validates the identified boot code, for example, by doing a byte-by-byte comparison of the boot code stored at block 602 to the boot code found by block 618. Instead of a byte-by-byte comparison, a hash of the boot code from block 618 may be compared to a known good hash. As a third alternative example, the boot code may also contain a hash of itself. The block 618 may validate the boot code using this hash. The block 618 may modify the boot code from block 618 until the boot code is valid for the computer system 110. Block 620 writes the validated boot code over the old boot code stored block 602 and the process 600 ends, whereafter other disk metadata recovery can occur.

Figure 7:
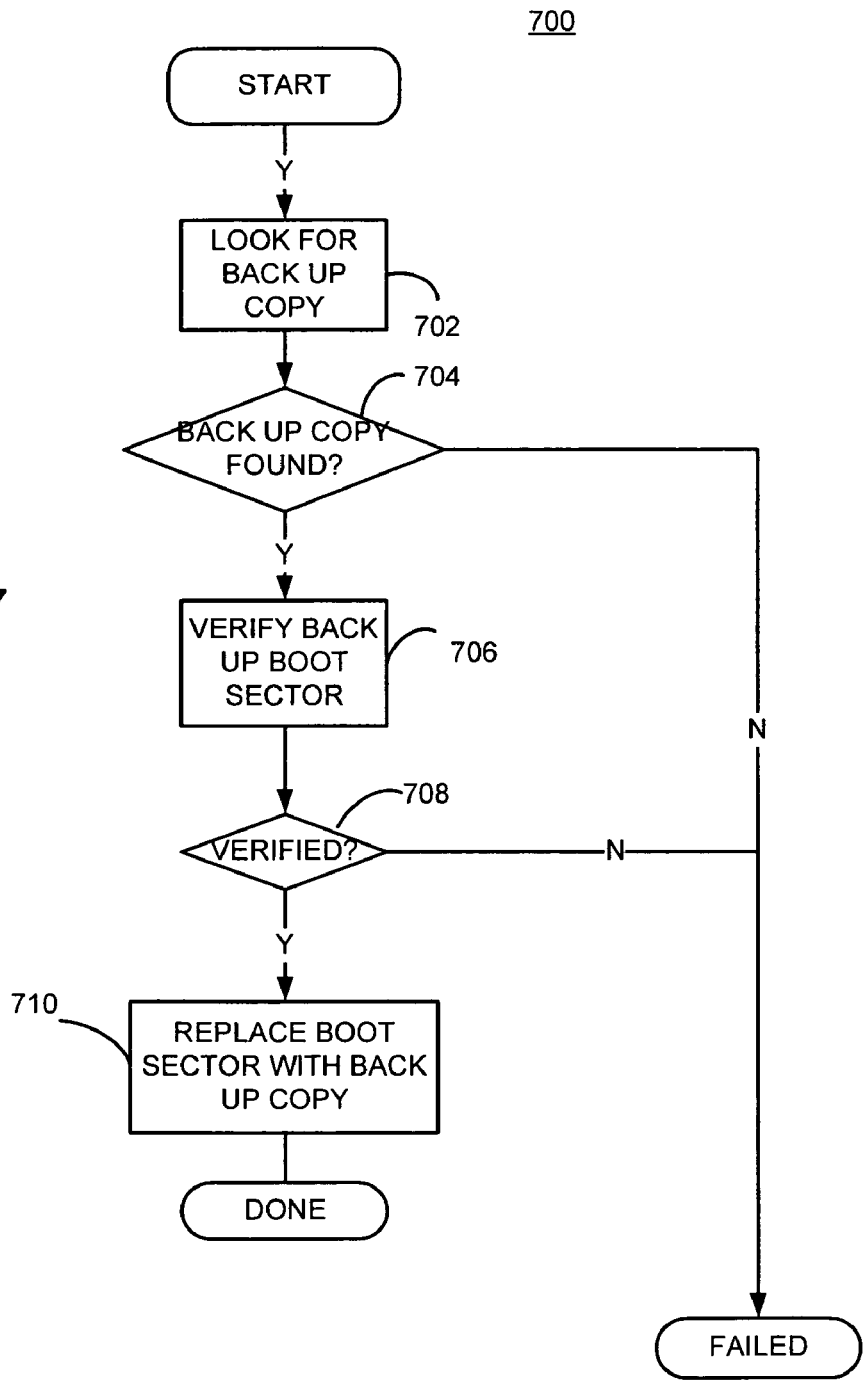
FIG. 7 illustrates an example disk metadata recovery operation that may be used to recover from a corrupt boot sector metadata.

When the recovery tool 300 determines that the partition table is correct, for example, when the block 506 identifies a valid active partition, the tool 300 may treat the boot sector as the root cause of the boot failure. FIG. 7 illustrates an example recovery process 700 for recovery form corrupt boot sector metadata, for example, as may be executed by block 508. The process 700 may be used to recover the boot sector metadata for either MBR, GPT, or other types of hard disks and for any kind of filesystem on that disk.

A block 702 looks for a backup rendition (e.g., copy) of the boot sector metadata, for example, at the end of a partition identified at block 506. If no backup copy is found, in the illustrated example, the process 700 ends. Although, in other examples, additional searching may be employed instead, such as a sector-by-sector search of the partition for the boot sector metadata, or a search of a predetermined location of a boot sector metadata. If a rendition of the boot sector metadata is found at block 704, a block 706 verifies the boot sector to determine whether the boot sector is valid for the computer system 110 and therefore may be used to recover the corrupt boot sector metadata. If the boot sector is verified as valid, a block 708 passes control to a block 710 which replaces the boot sector of the active partition with the backup copy of the boot sector.

Figure 8A:
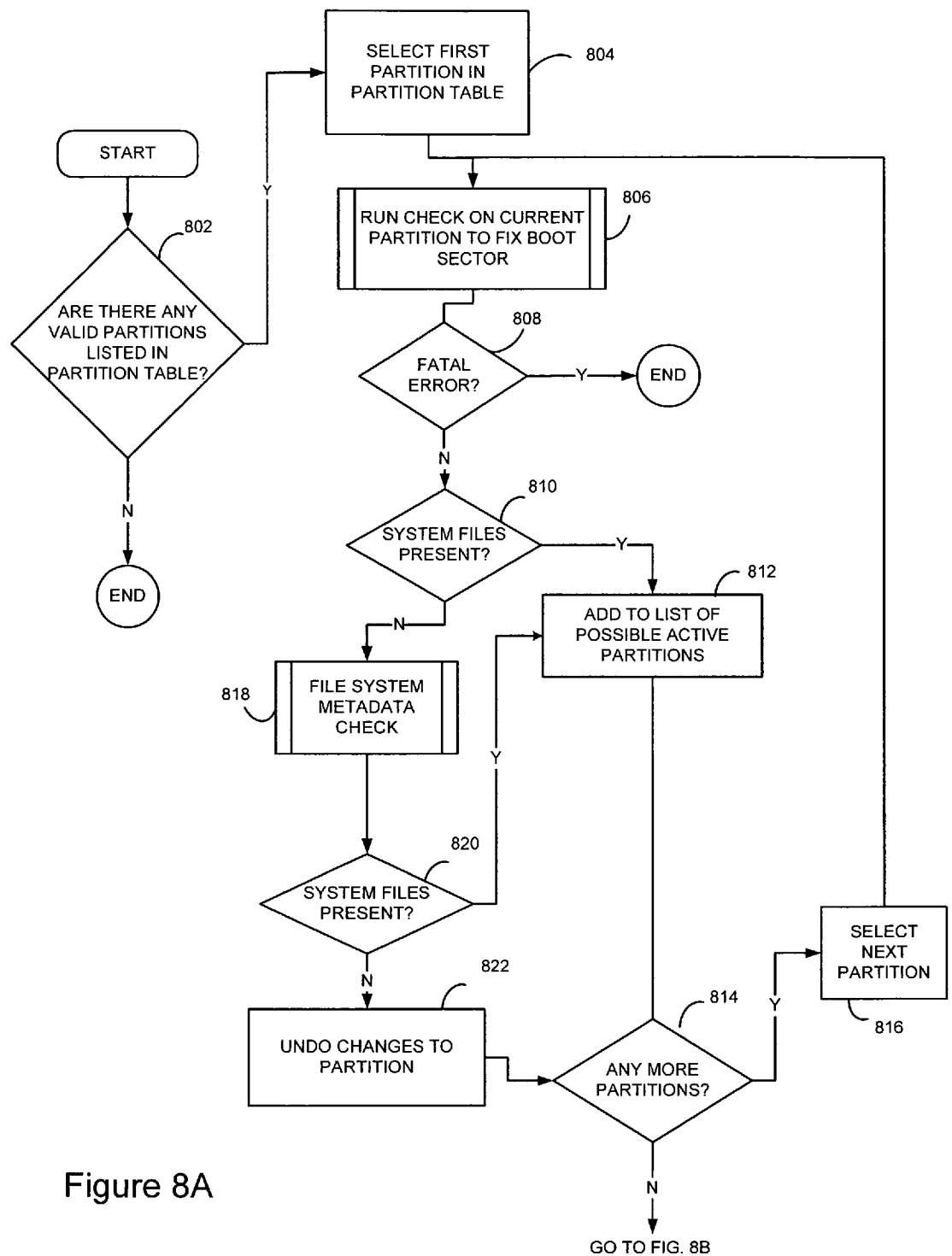
FIGS. 8A and 8B illustrate an example disk metadata recovery operation that may be used to recover from corrupt partition table metadata.
Figure 8B:
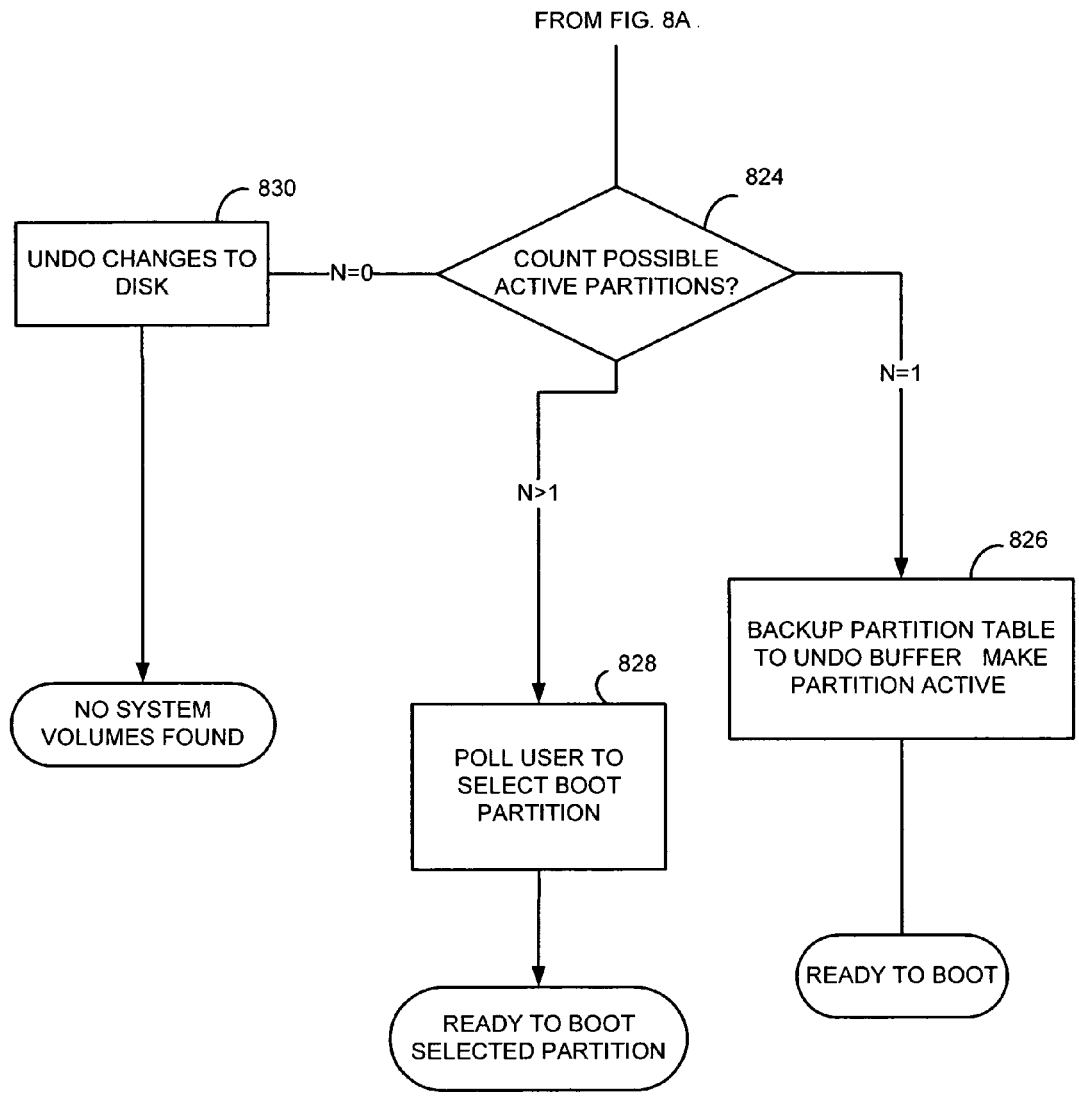

FIGS. 8A and 8B illustrate a process 800 that may be executed by the recovery tool 300 when partitions are identified on the hard disk 141, but when no partition is identified as an active partition, e.g., where there is no identification of an active partition for MBR disk or an ESP for GPT disks. The process 800 may be executed by the block 514, for example.

A block 802 checks whether there are any valid entries in the partition table at all, whereafter in the illustrated example a process checks each of the valid partitions in the partition table to see whether it could be an active partition.

A block 804 initializes the loop. A block 806 analyzes the first partition by executing a file system check on the partition. The block 806 may analyze the boot sector metadata, for example, to determine if it is corrupt and accordingly fix the boot sector metadata. By way of example not limitation, the block 802 may execute a check and recovery of primary and backup boot sectors using the process 700. That is, the block 806 may infer the file system on the partition by checking the partition type, the boot sectors (primary & backup) and the contents of the boot disk.

If there was no error in the boot sector metadata or the boot sector metadata was recovered identified by block 808, then a block 810 attempts to look for system files in the partition identified in the boot sector metadata. In this way, the recovery tool 300 may use boot sector metadata, e.g., validated boot sector metadata, to recover the partition table metadata. If the system files are found, the partition is a candidate for the active partition, and a block 812 adds the partition to the list of possible active partitions before continuing at block 814 which determines if there are any other partitions in the partition table and passes control to a block 816 for selection of the next partition and restarting the process 800.

If block 810 fails to find any system files, then in the illustrated example a block 818 attempts to recover the partition to locate system files. The block 818 performs a file system metadata check, e.g., using a chkdsk routine, to check and repair the MFT to enable the process 800 to probe for system files. If the block 818 still fails to find the system files, a block 820 passes control to a block 822 which undoes all changes to the partition and passes control to the block 814 to determine if there are any additional partitions that might be the active partition.

If the block 820 does find the system files after the partition has been recovered, then the partition is an active partition candidate and is added to the active partition candidate list at block 812.

Once the block 814 determines that the list of valid partitions in the partition table is exhausted, the block 814 passes control to a block 824 that checks the list of candidate active partitions built up by process thus far. If there is exactly 1 active partition candidate, then this becomes the active partition and a block 826 backs up the partition table and sets the partition associated with the active partition candidate as the active partition.

If the block 824 identifies more than one possible active partition, a block 828 may then poll the user to identify one of the partitions as the active partition. If no active partition candidates were found by the block 824, then a block 830 undoes changes made to the hard disk 141, and the process ends.

Figure 9A:
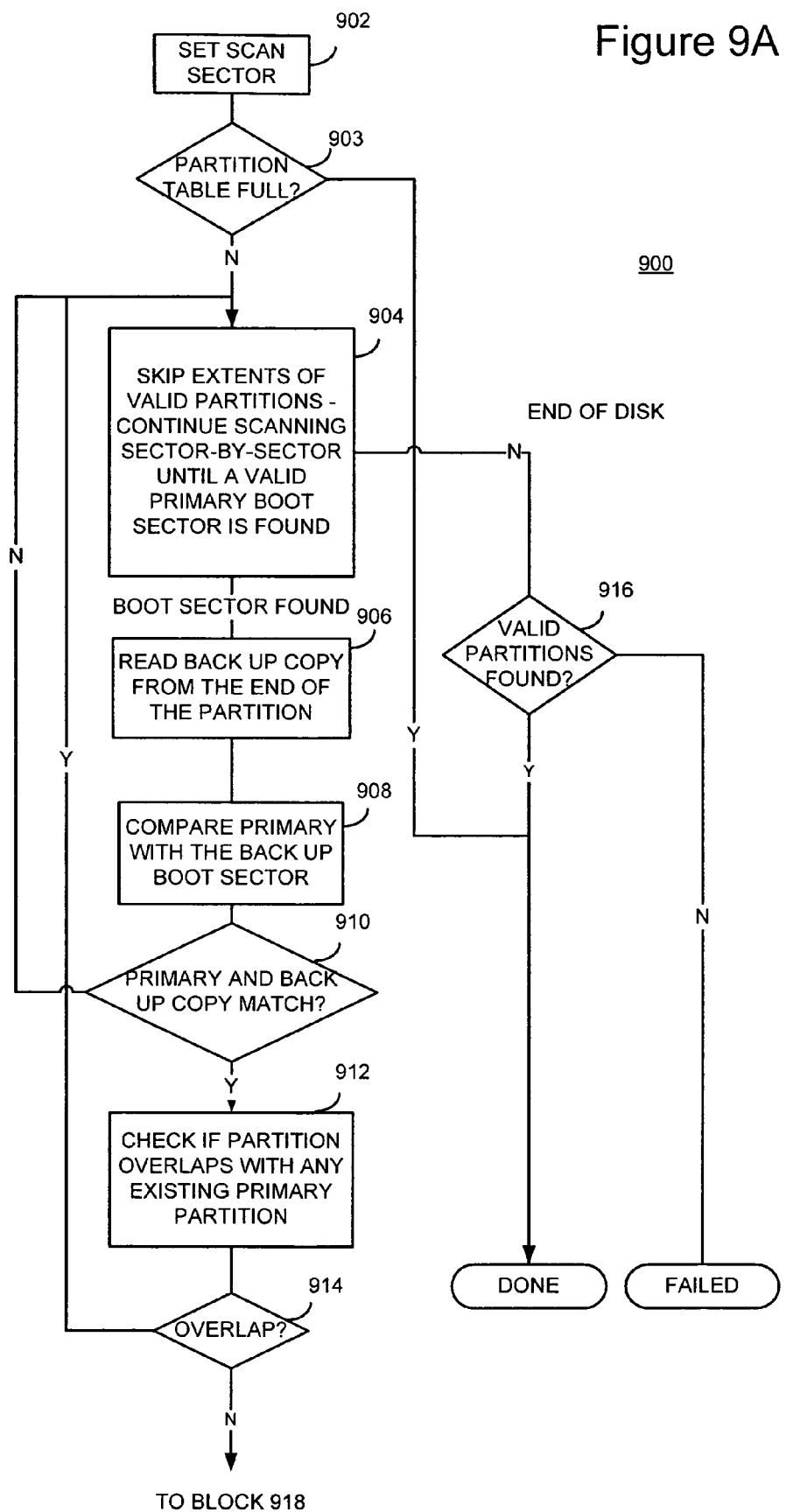

FIGS. 9A and 9B illustrate an example recovery of partition table metadata as may be executed by the blocks 514 of FIG. 5. A block 902 sets the disk sector at which to begin scanning for partitions. A block 903 first determines if the partition table is full, which in the first run it likely will not be. The process 900 then enters a loop at block 904 to find and validate a valid boot sector and then reconstruct the partition table from that boot sector metadata. The block 904 scans the hard disk 141 sector-by-sector looking for a valid primary boot sector. The look up could also be done cylinder-by-cylinder instead of sector-by-sector. The primary boot sector could be validated by validating its contents or by invoking a file system specific check, such as chkdsk. If the block 904 finds a valid boot sector, it could advance to block 912. In an example of the recovery process, as shown in FIG. 9A, if the block 904 finds a valid boot sector, a block 906 reads a backup copy from a desired location, such as the end of the current partition, and a block 908 compares the primary boot sector with the backup copy of the boot sector for validation. The backup copy validation is optional and may be skipped. The process 900 may calculate the end of partition using the offset of the primary boot sector and a size field located in the boot sector. If the primary and backup copies are different then a block 910 determines that the primary boot sector does not belong to a valid partition; and the process 900 loops back to block 904 to start scanning from the next sector after the primary boot sector. If the primary and back up boot sector copies are identical then the process 900 determines that the primary boot sector belongs to a valid partition, and the process 900 proceeds to block 912, where the process 900 checks whether the newly found partition overlaps with any existing primary partitions. If there is an overlap then control is returned to block 904, otherwise the process passes control to block 918. Another example of the tool may resolve the overlap by polling the user or choose one partition over the other based on some rules. If the block 904 reaches the end of the disk in scanning for valid partitions then a block 916 determines if a valid partition was found or not.

The block 918 reads from sectors of the primary boot sector, for example, from a hidden sectors field that contains a relative offset between the primary boot sector and the partition table that contains the partition entry for this partition. Therefore, for primary partitions, the hidden sectors field may be the offset of the active partition and the beginning of the disk, where the boot code is found. For extended partitions, hidden sectors may be the offset of the boot sector from the partition table that describes the logical drive.

In block 920, the process 900 compares the hidden sectors value with the offset of the primary boot sector (from the beginning of the disk). If they match, the process 900 determines that the new partition is a primary partition at block 922. At the block 924, the process 900 creates a primary partition entry for the new partition in the partition table. The process 900 may be programmed to fail to create the new entry if the partition table already has a predetermined number of primary partitions.

If the process 900 succeeds in creating the partition table entry, a block 925 passes control to a block 926 which tries to mount the newly found partition. If the partition cannot be mounted, the process 900 deletes the newly created entry from the partition table and fails, via blocks 928 and 930, as shown. If the volume is successfully mounted, the process 900 enumerates the root directory of the partition at block 932. If enumeration succeeds, a block 934 determines whether the partition has been accurately identified, and the process 900 continues searching for more partitions, starting at the end of the newly found partition, via block 936 if accurate identification has occurred. An alternative to enumerating the root directory in block 932 is to run a metadata check to validate the file system metadata.

If the partition table supports extended partitions the process 900 may discover extended partitions as follows. If in block 922 the hidden sectors field does not match the offset of the primary boot sector, then the process 900 may determine that the partition is an extended partition. Before attempting to validate the extended partition, in block 924, the process 900 may check whether the partition table is already full and whether an extended partition already exists. If either of these two conditions is satisfied, the process 900 fails right away. However, if the partition table does have the capacity of an extended partition, a block 940 passes control to a block 942, which reads the sector that is hidden sectors behind the primary boot sector, to determine if it might contain the partition table of the extended partition. The process then checks whether the hidden sector actually contains the extended partition table in block 944.

If block 944 returns a yes, then a block 946 follows the extended partition chain and performs checks on each link. In addition, the block 946 may check that the first entry always points forward on the disk. The process 900 may follow the chain of partitions only in the forward direction thus avoiding any loops in partition links. If any link in the chain is invalid, the process 900 may consider the whole extended partition chain invalid and fail, via block 948. If all the links in the partition chain are valid, the process 900 adds this extended partition to the partition table via block 950 and passes control to block 926 and follows the process as described above.

Figure 10:
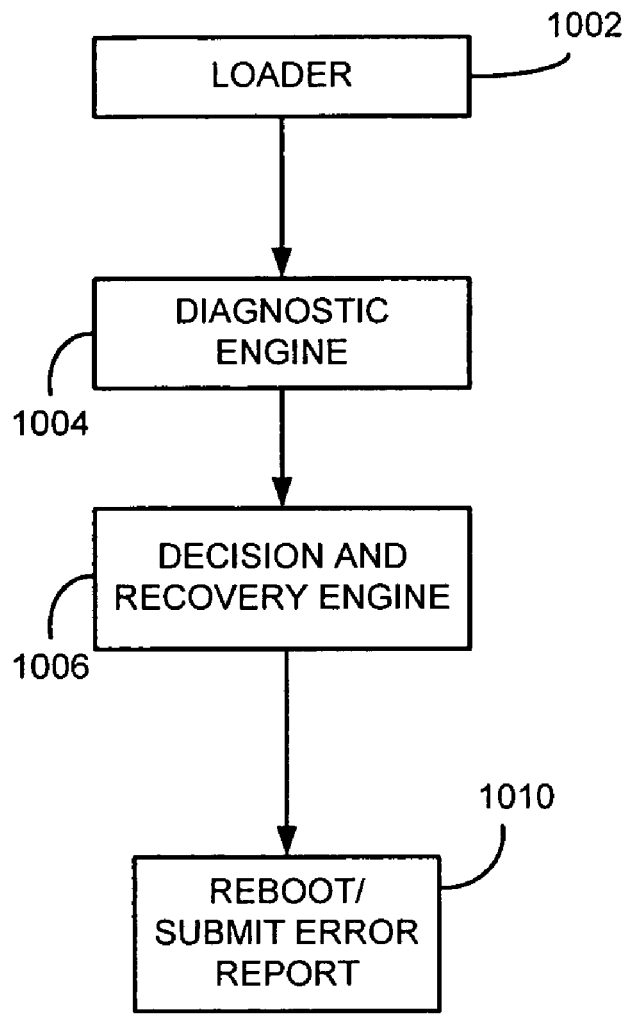
FIG. 10 illustrates an example implementation of the recovery tool used as a component of an overall recovery environment.

The recovery tool 200 may be part of an overall recovery environment such as that described in U.S. application Ser. No. 11/117,846, entitled "Automated Recovery of Unbootable Systems" Levidow et al. and filed on Apr. 29, 2005, incorporated herein by reference. FIG. 10 illustrates an example recovery environment 1000 that may be used to recover the computer system 110 in the event of a failed attempt to boot the target operating system 144. The recovery environment 1000 may present a host operating system bootable on the computer system 110, but different than the target operating system 144, and execute boot diagnostic and recovery processes over that host operating system to recover the computer system 110 and boot the target operating system 144. The host operating system may be stored in the recovery partition 148. By way of example, the computer system 110 may automatically failover to the recovery environment 1000 after a set number of failed boot attempts, indicating a boot failure, have been detected. The recovery environment 1000 may then diagnose the root cause of the boot failure, determine a recovery action, and execute that recovery action to address the root cause. The illustrated process 900 is shown by way of example. Additional, fewer, or other blocks may be executed and various blocks may be combined for execution. Further still processes may be modified for different disks, e.g., for different partition types. By way of example, the blocks 940-950 may be removed or bypassed on GPT disks.

In the example of FIG. 10, the recovery environment 1000 includes a loader 1002, a diagnostic engine 1004, and a decision and recovery engine 1006. The loader 1002 may determine the occurrence of boot failure, for example, after a boot manager on the computer system 110 detects a specified number of failed boot attempts of the target operating system 144 and launches the recovery environment 1000.

The diagnostic engine 1004 may diagnose pre-operating system boot processes, e.g., system-wide processes and components that are not specific to an operating system, as well as operating system boot processes and components specific to the target operating system. The examination of pre-operating system boot processes may include the examination of the disk metadata described above; whereas the diagnosis of operating system boot processes may include the diagnosis of boot processes for the operating system, such as some of the processes executed by a boot manager and processes of the operating system loader and the operating system itself.

The engine 1004 identifies a root cause such as a corrupt disk metadata to the decision and recovery engine 1006, which then identifies and executes appropriate recovery actions to address the root cause. For example, the engines 1004 and engine 1006 may be combined to execute the recovery tool 300, which can diagnose a disk metadata root cause for the boot failure, determine which recovery action to take to address the root cause, and then execute that recovery action, for example. In the illustrated example, the recovery environment 1000 either reboots the computer system 110 at block 1010, if successful, or submits an error report of the failure to recover the disk metadata.

Although the forgoing text sets forth a detailed description of numerous different embodiments, it should be understood that the scope of the patent is defined by the words of the claims set forth at the end of this patent. The detailed description is to be construed as providing examples and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computing apparatus, comprising:
 a display unit;
 an input device;
 a first memory and a second memory;
 a target operating system stored in the first memory, the target operating system corresponding to a source operating system stored in the second memory;
 a processor coupled to the display unit, the input device, the first memory and the second memory;
 wherein first instructions are stored in the second memory that, when executed by the processor, perform at least one first boot process that is independent of the target operating system;
 wherein second instructions are stored in the second memory that, when executed by the processor, perform at least one second boot process that is dependent on the target operating system;
 wherein third instructions are stored in the second memory that are to be executed by the processor before the second instructions are executed by the processor, the third instructions, when executed,
  determine the occurrence of a corrupt one of a partition table or a boot sector as a part of the at least one first boot process,
  identify a valid other one of the partition table metadata or the boot sector metadata,
  analyze the valid other one of the partition table or the boot sector, and
  in response to the analysis of the valid other one of the partition table or the boot sector, recover the corrupt one of the partition table or the boot sector based on information in the valid other one of the partition table or the boot sector; and
 wherein the third instructions, when executed by the processor, allow a boot error that results from the at least one first boot process to be automatically corrected without requiring any intervention by a user of the computing apparatus.

2. The computing apparatus of claim 1, wherein the third instructions, when executed by the processor,
 identify a partition with a valid rendition of the corrupt one of the partition table or the boot sector, and
 replace the corrupt one of the partition table or the boot sector with the valid rendition of the corrupt one of the partition table or the boot sector.

3. The computing apparatus of claim 2, wherein the third instructions, when executed by the processor,
 scan the hard disk for a boot sector, and
 validate the boot sector as the valid boot sector, wherein the valid boot sector comprises partition identification data.

4. The computing apparatus of claim 1, wherein the corrupt one of the partition table or the boot sector comprises a corrupt partition table and wherein the valid other one of the partition table or the boot sector comprises a valid boot sector, wherein the third instructions, when executed by the processor,
 scan the hard disk for valid partitions, and
 construct a valid partition table to include a listing of the valid partitions.

5. The computing apparatus of claim 1, wherein the corrupt one of the partition table or the boot sector comprises a corrupt boot sector and wherein the valid other one of the partition table or the boot sector comprises a valid partition table, wherein the third instructions, when executed by the processor,
 identify the corrupt boot sector,
 access a partition identified in the valid partition table and having a rendition of the corrupt boot sector, validate the rendition of the corrupt boot sector, and
replace the corrupt boot sector with the validated rendition of the corrupt boot sector.

6. The computing apparatus of claim 1, wherein the first memory comprises a hard disk drive.

7. The computing apparatus of claim 1, wherein the second memory device comprises a read-only memory.

* * * * *